United States Patent [19]

Affeldt

[11] Patent Number: 4,463,070

[45] Date of Patent: Jul. 31, 1984

[54] CYLINDRICAL GALVANIC CELLS HAVING A POLYGONAL SHAPED ANODE DISC

[75] Inventor: Richard B. Affeldt, Westlake, Ohio

[73] Assignee: Union Carbide Corporation, Danbury, Conn.

[21] Appl. No.: 480,295

[22] Filed: Mar. 29, 1983

[51] Int. Cl.³ .............................................. H01M 6/14
[52] U.S. Cl. .................... 429/194; 429/196; 29/623.1
[58] Field of Search ............. 429/194, 196, 105, 209; 29/623.1

[56] References Cited

U.S. PATENT DOCUMENTS 2,705,253  3/1955  Kirkman ..................... 429/209 X
4,154,906  5/1979  Birbnick ..................... 429/194 X
4,243,733  1/1981  Brennan ......................... 429/194

FOREIGN PATENT DOCUMENTS 57-128459  8/1982  Japan.

Primary Examiner—Charles F. LeFevour
Attorney, Agent, or Firm—Clement J. Vicari

[57] ABSTRACT

A polygonal shaped anode disc, such as lithium, housed in a sealed cylindrical cupped container and a method for producing the polygonal anode disc for use in galvanic cells, such as miniature nonaqueous button or coin cells.

16 Claims, 8 Drawing Figures

CYLINDRICAL GALVANIC CELLS HAVING A POLYGONAL SHAPED ANODE DISC

TECHNICAL FIELD

This invention relates to a cylindrical galvanic cell and a method for producing it, said cell employing a polygonal shaped anode disc having a circumference composed of at least four segments of which at least two are straight segments and having a surface area of at least 82 percent of the area of a circle circumscribed about said anode disc. When the anode disc is disposed over a separator and assembled within a cylindrical cupped container a plurality of cavities are defined between the outer circumference of the anode disc and the inner wall of the cell housing which can be used as reservoir sites for the cell's electrolyte and/or accommodate any gaseous or reaction products produced in the cell.

BACKGROUND ART

The development of high energy battery systems requires the compatibility of an electrolyte possessing desirable electrochemical properties with highly reactive anode materials, such as lithium, sodium, and the like, and the efficient use of high energy density cathode materials, such as manganese dioxide, $FeS_2$, $CuO$, $CuS$, $Co_3O_4$, $PbO_2$, oxyhalides, and poly-carbon fluorides having the general formula $(C_yF_x)n$ wherein y is 1 or 2, x is greater than 0 up to about 1.5 and wherein n refers to the number of monomer units which can vary widely. It has, therefore, been necessary, in order to realize the high energy density obtainable through use of these highly reactive anodes and high energy density cathodes, to turn to the use of nonaqueous electrolyte systems. In the manufacturing and assembly of these high energy cell systems, the anodes, such as lithium, are usually soft materials that are stamped from strips or sheets into circular discs for use in cylindrical nonaqueous cells.

In the manufacture of soft strips of lithium, it has been proposed in the prior art, specifically U.S. Pat. No. 3,721,113, that thin continuous lithium strips can be produced by cold rolling lithium metal while it is compressed between smooth surfaces of a solid polymeric composition, which composition is nonreactive with lithium and has a critical surface tension of not over 46 dynes per centimeter at 20° C. The use of the polymeric sheet material is essential so as to prevent the sticking of the lithium to the metal surfaces of the roller. Once continuous lithium strips are produced another problem encountered is in the cutting of the lithium metal into a plurality of pieces which can be employed as lithium anodes in various types of cell systems. To overcome this problem, it is disclosed in the prior art, specifically U.S. Pat. No. 4,060,017, that a flexible film, preferably of plastic, be interposed between the blade of a cutting device and a lithium strip such that when the blade is forced against the anvil with sufficient force to cut the lithium, the film prevents contact of the blade with the lithium. This will prevent any buildup of lithium being developed on the blade which would occur generally after only a few cutting operations.

Due to the relative softness of the lithium material, the lithium anode circular discs are generally stamped from a strip having a width larger than the diameter of the desired lithium disc to ensure that the discs can be produced on a continuous and reproducible basis without distortion. This results in a scrap loss of lithium that can be as high as 62 percent.

Japanese published unexamined application JA 82/128459 discloses the fabrication of lithium anodes in the shape of squares which can be cut from a strip of lithium having a width equal to the length of a side of the lithium anode. Although this method will reduce the scrap loss of lithium when producing square lithium anodes from lithium strips, it has the disadvantage in that for a fixed thickness, too much of the lithium is removed when such anode is employed in a cylindrical cupped container. For example, a square lithium anode would have to be increased in thickness by 57 percent of the thickness of a circular anode to equal the amount of lithium contained in the circular anode having a circumference circumscribed about the square anode. Miniature electronic devices which require the use of thin but powerful cylindrical electrochemical cells may not be able to tolerate this increase in anode height in the cell.

One of the objects of the present invention is to provide a polygonal shaped anode disc, such as lithium for use in cylindrical (button, coin, etc.) cell containers, that can be easily fabricated from lithium strips with minimum scrap loss.

Another object of the present invention is to provide a polygonal shaped anode disc having a circumference composed of at least four segments of which at least two of the segments are straight segments.

Another object of the present invention is to provide a polygonal shaped lithium anode disc having a surface area of at least 82 percent of the area of a circle circumscribed about said polygonal shaped anode.

Another object of the present invention is to provide a method for producing polygonal shaped anode discs, such as lithium anodes for use in a cylindrical cupped container, on a continuous basis from a strip of the anode material with minimum scrap loss.

The foregoing and additional objects will become more fully apparent from the following description and drawing

DISCLOSURE OF INVENTION

The invention relates to a nonaqueous cell comprising a cathode; an anode disc, a separator disposed between said cathode and said anode, and an electrolyte housed in a cylindrical cupped container sealed at its open end by a closure means; the improvement wherein said anode disc has a circumference composed of at least four segments of which at least two segments are straight segments and wherein the single faced surface area of said anode disc is at least 82 percent of the area of a circle circumscribed about said anode disc.

The invention also relates to a method for assembling a cylindrical, nonaqueous cell comprising the steps:

(a) preparing a cylindrical cupped container having a base, an upstanding side wall and an open end;

(b) preparing a strip of anodic material having a width equal to or smaller than the inner diameter of the cylindrical container;

(c) cutting said strips of anodic material in a length equal to or smaller than the inner diameter of the cylindrical cupped container to provide a polygonal anode disc having a circumference composed of at least four segments of which at least two segments are straight segments and wherein the surface area of said anode disc is at least 82 percent of the area of a circle circumscribed about said anode disc; and (d) assembling into and sealing within said cylindrical cupped container a cathode, a separator, an electrolyte and said polygonal anode disc.

As used herein, a polygonal shaped anode disc shall mean an anode having a circumference composed of a plurality of straight segments or a plurality of straight and arc segments.

The surface area of the anode disc for use in this invention should be at least 82 percent of the area of a circle circumscribed about said anode disc, preferably about 90 percent or more of the area of a circle circumscribed about said anode disc. In thin button or coin cells a polygonal shaped anode disc having an area below 82 percent of the area of a circle circumscribed about said anode disc would sacrifice too much anodic material for a fixed cell height or would require an excessive increase in height if the cell was to accommodate an amount of anodic material substantially equivalent to the amount of material that would be contained in a circular anode disc. As stated above, a square anode would have to be increased in height by 57 percent if it were to contain the same amount of anodic material as a circular disc having a diameter equal to the diagonal length of the square anode disc. In addition, when using a square anode disc in a cylindrical cupped container, its surface area is drastically reduced thereby reducing the rate capability of the cell.

When the polygonal anode disc of this invention is assembled in a cylindrical cupped container, cavity or reservoir sites are defined between the outer circumference of the anode and the inner wall of the container which can be used to contain an additional amount of the cell's electrolyte and/or accommodate gaseous or reaction products produced in the cell.

A preferred polygonal anode disc would have a circumference composed of four segments of which two would be straight segments and two would be arc segments. The straight segments and arc segments would alternate and could be cut from a strip of anodic material having a width equal to the diameter of the circle that would circumscribe the anode disc. In this embodiment, the anode disc can be easily and economically fabricated from a strip of anodic material with minimum scrap loss and would have a surface area of about 97.5 percent of the surface area of a circle circumscribed about said anode disc. Using this embodiment for the anode disc in a cylindrical cupped container would require an increase in height of the anode disc by only 2.5 percent if it were to contain the same amount of anodic material as in a circular anode circumscribed about said polygonal shaped anode disc.

Another preferred embodiment for the polygonal anode disc of this invention would be a modified octagonal shaped anode having eight segments of which four would be straight segments and four would be arc segments defining its circumference. The straight segments and arc segments would alternate. In this embodiment, the anode disc can be easily and economically fabricated from a strip of anodic material with minimum scrap loss and have a surface area of about 95 percent of the surface area of a circle circumscribed about said anode disc. Using this embodiment for the anode disc in a cylindrical cupped container would require an increase in height of the anode disc by only 5 percent if it were to contain the same amount of anodic material as in a circular anode circumscribed about said modified octagonal shaped anode disc. Four cavities defined by the outer circumference surface of the modified octagonal shaped anode disc and the inner wall of a cylindrical cupped container can be used as electrolyte reservoir sites or cavity sites to accommodate any gas or reaction products formed in the cell.

Another preferred embodiment for the polygonal anode disc of this invention would be an octagonal shaped anode having eight straight equal length segments defining its circumference. In this embodiment, the anode disc can be easily and economically fabricated from a strip of anodic material with minimum scrap loss and have a surface area of about 90 percent of the surface area of a circle circumscribed about said anode disc. Using this embodiment for the anode disc in a cylindrical cupped container would require an increase in height of the anode disc by only 11 percent if it were to contain the same amount of anodic material as in a circular anode circumscribed about said octagonal shaped anode disc. Eight cavities defined by the outer circumference surface of the octagonal shaped anode disc and the inner wall of a cylindrical cupped container can be used as electrolyte reservoir sites or cavity sites to accommodate any gas or reaction products formed in the cell.

A benefit which is realized in some cell constructions by having cavities disposed around the anode is that liquid electrolyte can be fed into the cavities to rapidly contact the separator thereby simplifying and facilitating the assembly of the cell.

Active anode material suitable for use in this invention can be selected from the group consisting of aluminum, the alkali metals, alkaline earth metals and alloys of alkali metals or alkaline earth metals with each other and other metals. The term "alloys" as used herein and in the appended claims is intended to include mixtures, solid solutions, such as lithium-magnesium, and the intermetallic compounds, such as lithium monoaluminide. The preferred anode materials are lithium, sodium, potassium, calcium, magnesium and alloys thereof. Of the preferred anode materials, lithium would be the best because, in addition to being a ductile metal that can be easily assembled in a cell, it possesses the highest energy-to-weight ratio of the group of suitable anodes.

Active cathode materials suitable for use in this invention can be selected from the group consisting of $MnO_2$, $FeS_2$, $FeS$, $Co_3O_4$, $PbO_2$, $CuO$, $CuS$, $Bi_2O_3$, $Ag_2CrO_4$, $Pb_3O_4$, $Pb_2Bi_2O_5$, $V_2O_5$, liquid oxyhalides, and $CF_x$ in which x is greater than 0 up to 1.5.

Suitable cell systems for use in this invention would include $Li/MnO_2$; $Li/FeS_2$; $Li/CuO$; $Li/CuS$; and $Li/CF_x$.

A separator for use in this invention has to be chemically inert and insoluble in the cell system and have a porosity so as to permit the liquid electrolyte to permeate through and contact the electrodes of the cell, thus establishing an ion transfer path between the negative and positive electrodes.

BRIEF DESCRIPTION OF THE DRAWINGS

The present invention will become apparent from the following description thereof when considered together with the accompanying drawings which are set forth as being exemplary of the embodiments of the present invention and are not intended, in any way, to be limitative thereof and wherein:

Referring to FIG. 1, there is shown an anode strip 2, such as lithium, that has opposing triangular cuts 4 equally spaced apart along the edges of strip 2. By severing the strips along the broken lines, an octagonal shaped anode disc 6 can be formed. In practice, the forming of the triangular cuts 4 and the severing along the broken lines can be performed in one operation to effectively and efficiently produce octagonal shaped anode discs. An octagonal shaped anode disc 8 so formed is shown in FIG. 4 with a circle 10 circumscribed about said anode disc 8. In this embodiment, anode disc 8 would have a single faced surface area equal to 90 percent of the area of the circumscribed circle 10 and therefore would only have to be about 11 percent thicker than a circular anode disc to contain the same amount of anodic material that would be contained in a circular anode disc having the circular configuration 10. Defined between the circumference of octagonal shaped anode disc 8 and the circumference of circle 10 are cavities or pockets 12. When the anode disc is assembled in a cylindrical cupped container along with a cathode, an electrolyte and separator; the cavities 12 can be used as reservoirs for holding an additional amount of the cell's electrolyte and/or to accommodate any gas or reaction products formed in the cell.

FIG. 2 shows an anodic strip 14 that has opposing triangular type cuts 16 equally spaced along the edges of strip 14. By severing the strip along the broken lines, a modified octagonal shaped anode disc 18 can be formed. In practice, the forming of the triangular type cuts 16 and the severing along the broken lines can be performed in a single operation to effectively and efficiently produce modified octagonal shaped anode discs 18. A modified octagonal shaped anode disc 20 so formed is shown in FIG. 5 with a circle 22 circumscribed about said anode disc 20. In this embodiment, the circumference of anode disc 20 has four straight segments 24 each of which is separated by an arc segment 26 and overall will have a single faced surface area of 95 percent of the area of the circumscribed circle 22. Thus, the thickness of anode disc 20 would only have to be increased by about 5 percent of the thickness of a circular anode disc to contain the same anodic material that would be contained in a circular anode disc having the circular configuration 22. Defined between the circumference of anode disc 20 and the circumference of circle 22 are cavities or pockets 28. When anode disc 20 is assembled in a cylindrical cupped container along with a cathode, an electrolyte, and a separator; the cavities 28 can be used as reservoirs for holding an additional amount of the cell's electrolyte and/or to accommodate any gas or reaction products formed in the cell.

FIG. 3 shows an anodic sheet 30 that can be severed along the broken lines in a single operation to produce hexagonal shaped anode discs 32. A hexagonal shaped anode disc 34 so formed is shown in FIG. 6 with a circle 36 circumscribed about said anode disc 34. In this embodiment, hexagonal shaped anode disc 34 would have a single faced surface area equal to 82.7 percent of the area of the circumscribed circle 36 and therefore its thickness would have to be increased by about 21 percent of the thickness of a circular anode disc to contain the same amount of anodic material that would be contained in a circular anode disc having the circular configuration 36. Defined between the circumference of hexagonal shaped anode disc 34 and the circumference of circle 36 are cavities 38. When the hexagonal shaped anode disc 34 is assembled in a cylindrical cupped container along with a cathode, an electrolyte, and a separator; the cavities 38 can be used as reservoirs for holding an additional amount of the cell's electrolyte and/or to accommodate any gas or reaction products formed in the cell.

FIG. 7 shows an anodic strip 40 that has opposing triangular type cuts 42 equally spaced along the edges of strip 40. By severing the strip along the broken lines, a truncated circle shaped anode disc 44 can be formed. In practice, the forming of the triangular type cuts 42 and the severing along the broken lines can be performed in a single operation to effectively and efficiently produce truncated circle shaped anode discs 44. A truncated circle shaped anode disc 46 so formed is shown in FIG. 8 with a circle 48 circumscribed about said anode disc 46. In this embodiment, the circumference of anode disc 46 has two straight segments 50 each of which is separated by an arc segment 52 and overall will have a single faced surface area of 97.5 percent of the area of the circumscribed circle 48. Thus, the thickness of anode disc 46 would only have to be increased by about 2.5 percent of the thickness of a circular anode disc to contain the same anodic material that would be contained in a circular anode disc having the circular configuration 48. Defined between the circumference of anode disc 46 and the circumference of circle 48 are cavities or pockets 54. When anode disc 46 is assembled in a cylindrical cupped container along with a cathode, an electrolyte, and a separator; the cavities 54 can be used as reservoirs for holding an additional amount of the cell's electrolyte and/or to accommodate any gas or reaction products formed in the cell.

Figure 1:
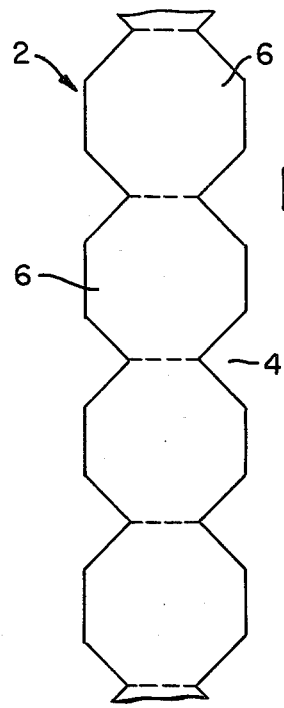
FIG. 1 is a plan view of an anodic strip material suitable for fabricating octagonal shaped anode discs of this invention.
Figure 2:
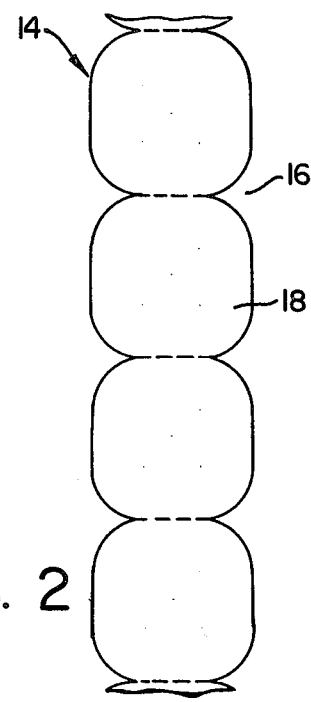
FIG. 2 is a plan view of an anodic strip material suitable for fabricating modified octagonal shaped anode discs of this invention.
Figure 3:
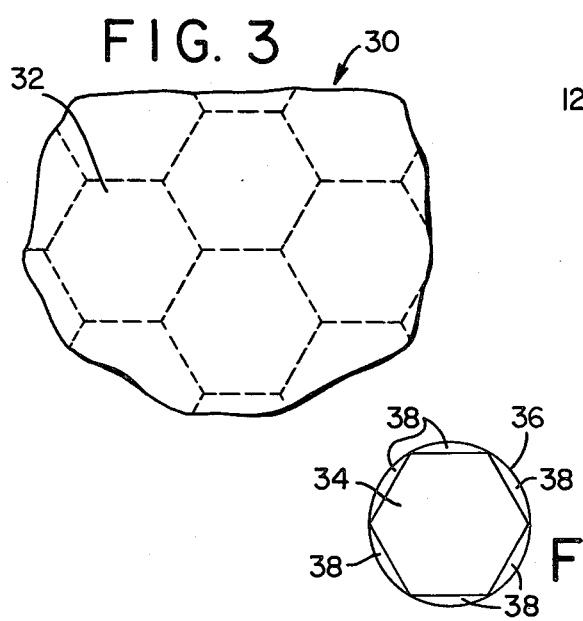
FIG. 3 is a plan view of an anodic sheet material suitable for fabricating hexagonal shaped anode discs of this invention.
Figure 4:
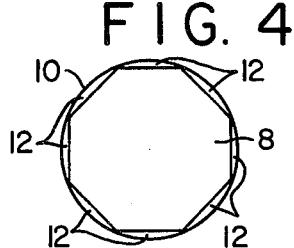
FIG. 4 is a plan view of an octagonal shaped anode disc of this invention with a circle circumscribed about said anode.
Figure 5:
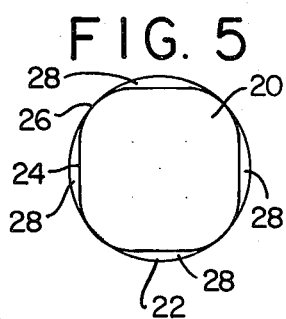
FIG. 5 is a plan view of a modified octagonal shaped anode disc of this invention with a circle circumscribed about said anode.
Figure 6:
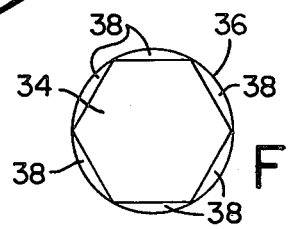
FIG. 6 is a plan view of a hexagonal shaped anode disc of this invention with a circle circumscribed about said anode.
Figure 7:
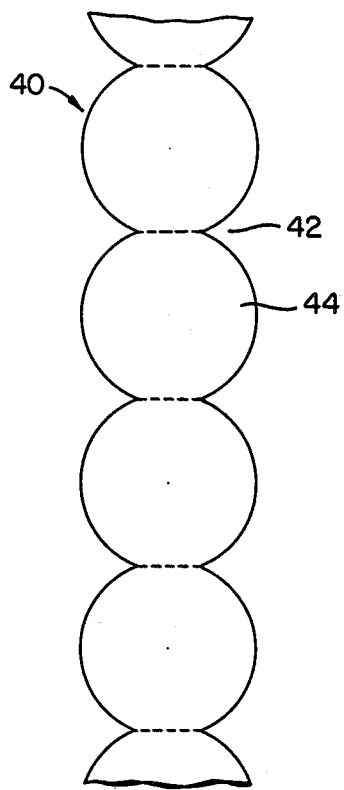
FIG. 7 is a plan view of an anodic strip material suitable for fabricating truncated circle shaped anode discs of this invention.
Figure 8:
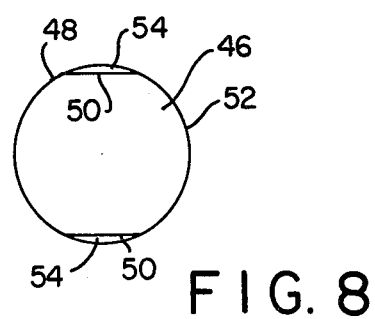
FIG. 8 is a plan view of a truncated circle shaped anode disc of this invention with a circle circumscribed about said anode.

It should be understood that the foregoing disclosure relates to preferred embodiments of the invention and it is intended to cover all changes and modifications of the invention which do not depart from the spirit and scope of the appended claims.

I claim:

1. A nonaqueous cell comprising a cathode, an anode disc, a separator disposed between said cathode and said anode disc, and an electrolyte housed in a cylindrical cupped container sealed at its open end by a closure means; the improvement wherein said anode disc has a circumference composed of at least four segments of which at least two segments are straight segments and wherein the single faced surface area of said anode disc is at least 82 percent of the area of a circle circumscribed about said anode disc.

2. The nonaqueous cell of claim 1 wherein the anode disc has a circumference composed of four straight segments and four arc segments with the straight and arc segments alternating, and wherein the single faced surface area of said anode disc is at least 95 percent of the area of a circle circumscribed about said anode disc.

3. The nonaqueous cell of claim 1 wherein the anode disc is an octagonal shaped anode and has a single faced surface area of at least 90 percent of the area of a circle circumscribed about said anode disc.

4. The nonaqueous cell of claim 1 wherein the anode disc is a hexagonal shaped anode and has a single faced surface area of at least 82.7 percent of the area of a circle circumscribed about said anode disc.

5. The nonaqueous cell of claim 1 wherein the anode disc has a circumference composed of two straight segments and two arc segments with the straight and arc segments alternating, and wherein the single faced surface area of said anode disc is at least 97.5 percent of the area of a circle circumscribed about said anode disc.

6. The nonaqueous cell of claim 1 wherein the said anode disc is selected from the group consisting of lithium, sodium, potassium, calcium, magnesium and alloys thereof.

7. The nonaqueous cell of claim 6 wherein the cathode is selected from the group consisting of $MnO_2$, $FeS_2$, $FeS$, $Co_3O_4$, $PbO_2$, $CF_x$, $CuO$, $CuS$, $Bi_2O_3$ $Ag_2CrO_4$, $Pb_3O_4$, $Pb_2Bi_2O_5$ and $V_2O_5$.

8. The nonaqueous cell of claim 6 wherein the anode is lithium and the cathode is $FeS_2$.

9. The nonaqueous cell of claim 6 wherein the anode is lithium and the cathode is $MnO_2$.

10. A method for assembling a cylindrical, nonaqueous cell comprising the steps:
   (a) preparing a cylindrical cupped container having a base, an upstanding side wall and an open end;
   (b) preparing a strip of anodic material having a width equal to or smaller than the inner diameter of the cylindrical container;
   (c) cutting said strips of anodic material in a length equal to or smaller than the inner diameter of the cylindrical cupped container to provide a polygonal anode disc having a circumference composed of at least four segments in which at least two segments are straight segments and wherein the single faced surface area of said anode disc is at least 82 percent of the area of a circle circumscribed about said anode disc; and
   (d) assembling into and sealing within said cylindrical cupped container a cathode, a separator, an electrolyte and said anode disc.

11. The method of claim 10 wherein in step (b) the anodic material is selected from the group consisting of lithium, potassium, sodium, calcium, magnesium, aluminum and alloys thereof.

12. The method of claim 10 wherein in step (d) the cathode is selected from the group consisting of $MnO_2$, $FeS_2$, $FeS$, $Co_3O_4$, $PbO_2$, $CF_x$, $CuO$, $CuS$, $Bi_2O_3$ $Ag_2CrO_4$, $Pb_3O_4$, $Pb_2Bi_2O_5$ and $V_2O_5$.

13. The method of claim 10 wherein the circumference of the anode disc formed in step (c) has four straight segments and four arc segments with the straight and arc segments alternating, and wherein the single faced surface area of the anode discs is 95 percent of the area of a circle circumscribed about said anode disc.

14. The method of claim 10 wherein in step (c) the anode disc formed has an octagon shape and wherein the single faced surface area of the anode disc is at least 90 percent of the area of a circle circumscribed about said anode disc.

15. The method of claim 10 wherein in step (c) the anode disc formed has a hexagon shape and wherein the single faced surface area of the anode disc is at least 82.7 percent of the area of a circle circumscribed about said anode disc.

16. The method of claim 10 wherein the circumference of the anode disc formed in step (c) has two straight segments and two arc segments with the straight and arc segments alternating, and wherein the single faced surface area of the anode disc is 97.5 percent of the area of a circle circumscribed about said anode disc.

* * * * *